Aug. 28, 1962 N. S. ZIMBEL 3,051,849
ELECTRICAL SWITCHING APPARATUS
Filed Nov. 12, 1958
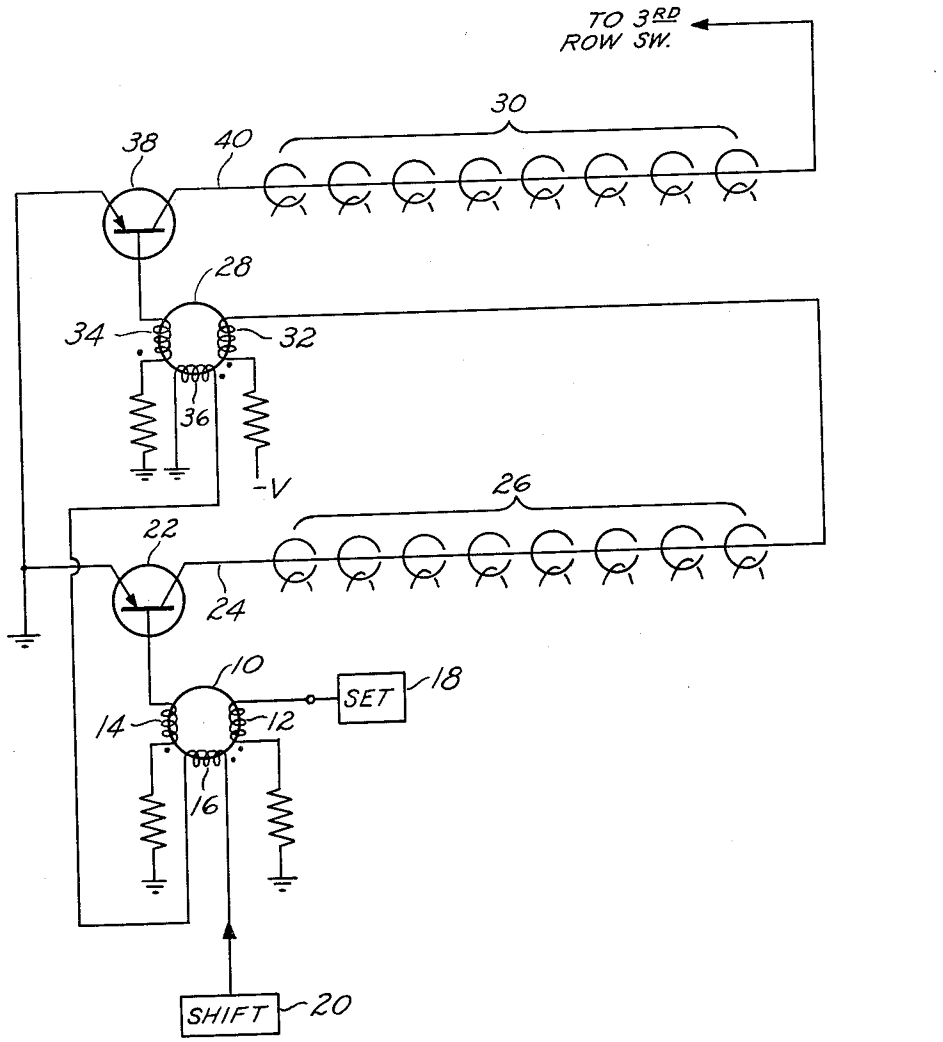
INVENTOR.
NORMAN S. ZIMBEL
BY Henry L. Hanson
ATTORNEY 3,051,849

ELECTRICAL SWITCHING APPARATUS

Norman S. Zimbel, Auburndale, Mass., assignor to Minneapolis-Honeywell Regulator Company, Minneapolis, Minn., a corporation of Delaware Filed Nov. 12, 1958, Ser. No. 773,242
7 Claims. (Cl. 307—88.5)

A general object of the present invention is to provide a new and improved electrical apparatus for use in controlling the selection and switching of electrical storage elements. More specifically, the present invention is concerned with an apparatus particularly useful with a sequentially addressed memory which may be of the type utilizing magnetic core devices as the memory elements.

In digital data processing equipment, it is sometimes desirable to store a plurality of bits of information in magnetic cores or other like storage means. When data is so stored, it is generally desired that this data be made available to a utilization circuit a plurality of bits at a time in what may be termed as characters or words. The words may well be stored in a matrix type of circuit and then called out from the matrix in a predetermined manner. Certain types of data processing equipment utilize sequentially addressed memory circuits for processing and manipulating data. It is in the latter area where this present invention has particular utility although the novel features thereof are not necessarily limited thereo.

It is accordingly a further more specific object of the present invention to provide new and improved circuitry for sequentially addressing a memory circuit.

As taught by the present invention, a very effective switching and selection circuit may be formed by the use of a bistable magnetic core working in combination with a transistor. The magnetic core can be used as a location or address storage element and as a means for providing a switching signal to a current controlling transistor which is effective to select a particular line associated with the memory.

Another object of the invention is therefore to provide a new and improved memory selection circuit comprising a bistable magnetic core connected in controlling relationship to a switching transistor.

The unique arrangement of the magnetic core and transistor elements in the present invention provides a circuit having a minimum number of components which is adapted to supply a regulated current to a memory selection line. As here presented, this type of circuit has very low input power requirements. In addition, the use of the transistor in the circuit combination provides for the stretching of the input switching pulse due to the hole storage effects created in the base region of the transistor when a switching pulse is applied thereto. This signal stretching is effective to insure that the circuit will operate in proper sequence and that the core devices used in the switching combination are not adversely affected by a shift current pulse. This action is extremely important in terms of the sequential operation of the circuit wherein a control signal is switched from one switching circuit to the next circuit in the sequence.

A further object of the invention is therefore to provide a new and improved switching circuit utilizing a magnetic core and transistor means for creating a switching signal for a memory circuit where the switching signal is of a time length greater than the time of the signal derived from the magnetic core.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawing and descriptive matter in which there is illustrated and described a preferred embodiment of the invention.

Referring to the single FIGURE, there is here illustrated a pair of switching circuits which are adapted to be operated in sequence for selecting information from two separate rows of signal storing means. More specifically, the numeral 10 identifies a bistable magnetic core element of the type having a substantially rectangular hysteresis characteristic. Wound upon this core is an input winding 12, an output winding 14, and a shift winding 16. As illustrated, the input winding 12 has a set signal source 18 connected thereto while the shift winding 16 has a shift signal source 20 connected thereto. The current levels of the signals received from either source 18 or 20 must be of such a magnitude that it will effect a switching of the core 10 from one state of residual magnetism to the opposite state.

Connected to the output winding 14 is a switching transistor 22, the latter having the usual base, emitter, and collector electrodes. The base electrode of the transistor 22 is directly coupled to the output winding 14 while the emitter-collector circuit of the transistor 22 is connected to a switching line or selection line 24. Located on this selection line 24 are a plurality of storage means which may well be bistable magnetic core elements of a type well known in the art. Ferrite core elements are widely used in this type of digital storage work. These storage elements 26 each have an output sense winding which is separate for each individual core. In addition, these core devices will normally include suitable input set windings, not shown, whereby a plurality of digits may be stored in each row of cores.

A second switching control core 28 is provided for controlling the switching of a further plurality of storage means 30 which may be of the same type as the storage means 26. The switching control core 28 includes an input winding 32, an output winding 34, and a shift winding 36. Connected to the output winding 34 is a further switching or control transistor 38, the latter having normal base, emitter, and collector-electrodes. The transistor 38 is connected in current controlling relation to a further switching or selection line 40.

As illustrated, current limiting resistors are connected in series with each of the input and output windings associated with the core devices 10 and 28.

Considering the operation of the circuit illustrated, it is first assumed that each of the cores 10 and 28 are in the reset or "zero" state. When a shift pulse is applied from the shift signal source 20 to the windings 16 and 36 respectively, the shift signal will have no effect on the cores 10 and 28, and consequently there will be substantially no output from either of these two cores.

In order to set up for the sequential addressing of the memory locations 26 and 30, the set signal source 18 will be activated and a set signal will be applied to the set winding 12 of core 10. This will switch the core 10 into a set or "one" state which will be opposite to the reset state created by the shift signal. Setting of core 10 causes an output signal of positive polarity relative to ground to be generated at the transistor base. This biases the transistor 22 further into the cutoff state. Once the core 10 has been set, the application of the shift signal will cause the core to switch from the set state to the reset state and a negative signal will be induced in the output winding 14. The negative signal induced in the output winding 14 will be such as to switch the transistor 22 into the conducting state in the emitter-collector circuit. When switched into the conducting state, a current flow circuit may be traced from the ground terminal through the emitter-collector circuit of the transistor 22, switching or selection line 24, to the set winding 32 of core 28, and to the negative power supply terminal —v. When the signal is applied to the selection line 24, any storage means having a signal stored therein will be switched so that the signal will be read out on the appropriate sense winding. This signal may then be fed through appropriate amplifying means to some utilization circuit.

When a shift pulse from the signal source 20 is applied to the winding 16, it is also applied to the winding 36. Inasmuch as the current flowing from the select line 24 passes through the input or set winding 32 of core 28, it is necessary, in order for the core 28 to be set, that the time length of the signal on the winding 32 be greater than the time length of the shift signal on the winding 36. If it is not greater, there is the danger that the shift current signal will tend to switch the core 28 back to the reset state. To this end, set windings on each of the cores are provided with more turns than are present on the shift windings 16 and 36. This insures that as long as the set signal is applied to the cores, it will swamp out any effect resulting from the shift signal current flowing in the shift windings. The stretching of the output signal from the core 10 is effected by the hole storage condition created in the base region of the transistor 22. Once a drive signal is applied to the base region, an excess hole condition is created and it requires a finite time for this hole condition to dissipate from the base region. This causes an effective stretching of the duration of the output current from the transistor 22, flowing in the emitter-collector circuit, which lengthens the time that the set signal is applied to the set winding 32.

As long as the signal on the set winding 32 is of a time duration greater than the signal on the shift winding 36, it is assured that the core 28 will be set by the signal stepping out of the core 10.

As soon as the next shift signal is applied from the source 20, the set condition of the core 28 will be read out into the output winding 34 and into the base of the transistor 38. A current flow will then be established in the selection line 40 by way of the emitter-collector circuit of the transistor 38 so that the memory elements 30 may be selected, as were the elements 26 on the previous shift signal. The signal on the selection line or switching line 40 may also be coupled into a further switching circuit of the type illustrated for the memory elements 26 and 30. Once again, as with the transistor 22, the hole storage effect of the transistor 38 is relied upon to create a time stretching of the signal in the selection lines so that the next core in the sequence will be set and there will be no interference from the shift signal applied to the next switching core in the sequence.

It will be apparent that any number of rows of elements may be sequentially switched, and that such elements may be connected to operate in a close ring sequence or in any other desired manner. Further, it will be apparent that the present circuit utilizes a minimum of circuit components for effecting the desired switching of the memory elements and that the power requirements for such circuit elements are minimized.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure Letters Patent is:

1. An electrical switching circuit comprising a first magnetic core having a rectangular hysteresis characteristic and having input, output, and shift windings, a first transistor having base, emitter, and collector electrodes, means connecting said base to an output winding on said magnetic core, a pair of power supply terminals, a first data storage means, a switching line passing through said data storage means, a second magnetic core having a rectangular hysteresis characteristic and having input, output, and shift windings, a second transistor having base, emitter, and collector electrodes, means connecting the base of said second transistor to the output winding of said second magnetic core, and means including said switching line connecting the emitter-collector circuit of said first transistor to said pair of power supply terminals independently of said first magnetic core and to the input winding of said second magnetic core.

2. Apparatus for switching in sequence a plurality of rows of storage cores including a selector circuit for each row of cores, comprising a bistable magnetic core device having input, output, and shift windings, a transistor having base, emitter, and collector terminals, means connecting said output winding to the base of said transistor, circuit means independent of said magnetic core device connecting the emitter-collector circuit of said transistor to a selection circuit for a row of cores and to an input winding of a further magnetic core device associated with another row of cores, and a pair of power supply terminals connected to the ends of said last named circuit.

3. Apparatus for switching in sequence a plurality of rows of storage cores including a selector circuit for each row of cores, comprising a bistable magnetic core device having input, output, and shift windings, a pulse stretcher comprising a transistor having base, emitter, and collector terminals, means connecting said output winding to the base of said transistor, so that when said core is switched a signal will be applied to the base of said transistor to create an excess number of holes in the base region, said holes requiring a finite time to dissipate to thereby stretch the time of an input pulse, circuit means independent of said magnetic core device connecting the emitter-collector circuit of said transistor to a selection circuit for a row of cores and to an input winding of a further magnetic core device associated with another row of cores, and a pair of power supply terminals connected to the ends of said last named circuit.

4. Apparatus for switching in sequence a plurality of rows of storage cores including a selector circuit for each row of cores, comprising a bistable magnetic core device having input, output, and shift windings, a transistor having base, emitter, and collector terminals, means connecting said output winding to the base of said transistor, a further magnetic core device having input, output, and shift windings, circuit means independent of said magnetic core device connecting the emitter-collector circuit of said transistor to a selection circuit for a row of cores and to an input winding of said further magnetic core device associated with another row of cores, and a pair of power supply terminals connected to the ends of said last named circuit.

5. Apparatus as defined in claim 4 wherein said shift windings are connected in a series circuit to a shift signal source.

6. Apparatus as in claim 5 wherein the input winding on each of said cores has more turns than the corresponding core shift winding.

7. Apparatus for switching in sequence a plurality of rows of storage cores including a selector circuit for each row of cores, comprising a bistable magnetic core device having input, output, and shift windings, each of said input windings having more turns than its corresponding shift winding, a transistor having base, emitter, and collector terminals, means connecting the output winding to the base of said transistor, means connecting the emitter-collector circuit of said transistor to a selection circuit for a row of cores and to an input winding of a further magnetic core device associated with another row of cores, and a pair of power supply terminals connected to the ends of said last-named circuit.

References Cited in the file of this patent

UNITED STATES PATENTS

| | | |
|---|---|---|
| 2,591,406 | Carter et al. | Apr. 1, 1952 |
| 2,808,990 | Allen | Oct. 8, 1957 |
| 2,899,571 | Myers | Aug. 11, 1959 |